Patented June 24, 1930

1,767,533

UNITED STATES PATENT OFFICE

LESTER KIRSCHBRAUN, OF LEONIA, NEW JERSEY, ASSIGNOR TO THE FLINTKOTE COMPANY, OF BOSTON, MASSACHUSETTS, A CORPORATION OF MASSACHUSETTS

PAVEMENT

No Drawing. Original application filed May 26, 1920, Serial No. 384,258. Divided and this application filed October 8, 1928. Serial No. 311,257.

This application is a division of my application Serial No. 384,258 filed May 26, 1920, issued as Patent No. 1,690,020, patented October 30th, 1928.

This invention relates particularly to a combined bituminous and concrete pavement.

Among the salient objects of this invention are to provide a construction in which the bituminous wearing surface is integrally bonded and united with the concrete base, the bonding action taking place before the concrete has set; to provide a construction in which the stones of the wearing surface are partially embedded in and held in place by both the concrete base and the bituminous wearing surface; to provide a bituminous wearing surface which is extremely malleable and has maximum shock absorbing ability, yet is not liable to displacement due to the anchorage of the large particles of its mineral aggregate in the concrete base; to provide a bituminous wearing surface which may become adhesively united to the concrete base, the whole structure while having the rigidity and strength, nevertheless, possesses the advantages of a resilient or non-abrasive wearing surface, due to my novel bituminous composition and method of applying same.

The process of laying the pavement may be described as follows:

A Portland cement concrete foundation is laid in the usual manner. Upon this concrete foundation while the same is still plastic and before it has time to set, there is applied a bituminous surfacing composed of an emulsified mixture of water, clay and bitumen to which may be added, if desired, a fibrous or other reinforcement.

The bituminous surfacing may be prepared as follows: Clay containing colloidal particles is mixed with preferably hot water to form a viscous, mud-like mixture. Care must be taken that all the particles which are susceptible of action by water are broken down by thorough mixing and agitation. To this mixture there is added bitumen such as asphalt in a heated liquid condition. Preferably this asphalt would be of a rather soft nature of say approximately 100 penetration for moderate conditions of traffic, although this will vary as will be understood by those skilled in the art for various climatic and traffic conditions. In any event, the bitumen must be of such a character that upon the evaporating of the moisture, it will readily flow so as to coalesce under normal atmospheric temperature conditions. The asphalt is gradually poured into the aqueous mixture in such a way as to form a stiff emulsion in which the water forms the external phase and the bitumen the internal phase.

It is to be noted that the asphalt should be poured into the clay and not the clay into the asphalt, in order to accomplish the desired emulsion and prevent the inversion of the above phases. Preferably the asphalt should be heated to a temperature of 300° F. to 400° F. as it is poured into an aqueous mixture—this elevated temperature being desirable in order to effect the most complete dispersion of the asphalt with the clay and water. The mixing operation is best effected or may be carried out in a double pug mill mixer. The fact that the clay may contain sand or other mineral particles will not necessarily prevent its being used. The following proportions by weight may be used: clay 50; water 25; asphalt 15 parts. The clay is the major portion of the emulsion. This emulsion may then be spread cold by rakes or templets over the wet concrete foundation. It is desirable that as the emulsion is being raked or spread, the rakes enter the wet concrete and more or less mix the concrete and bituminous emulsion together.

By this method, the laitance which prevents the adhesion of bitumen to concrete is removed and the surface of the foundation put in prime condition for permitting adhesion of the bitumen.

By the expression "enert emulsifying agent" as used in the claims, I intend to include emulsifying agents which, as in the case of the clay referred to herein, are inert towards and are not reacted upon by the alkaline constituents of the concrete foundation, so that the emulsion will retain its stability and not be broken by such constituents when applied to the concrete foundation in accordance with the present invention. Necessarily also, water contained in the external phase of the emulsion serves to delay the evaporation of water from the concrete base, and thereby assists in curing the wet concrete foundation.

After this wearing surface has been spread, I take stone of suitable size depending on the thickness of the wearing surface, as for example, 1½" stone with a 1" wearing surface and spread this stone evenly over the wet bituminous mixture and force it through the mixture by means of tampers or light rollers until the stone has penetrated through the bitumen and become partially embedded into the concrete base. The concrete base is allowed to set and the water evaporates, the bitumen coalesces and the pavement is then open to traffic. If desired, with the emulsion may be mixed a fibrous constituent as for example, paper stock, vegetable or mineral fibres, sawdust or the like.

I claim as my invention:

1. A product comprising a concrete structure and an adherent layer consisting essentially of coalesced bitumen particles derived from a water external phase emulsion, said adherent layer being interlocked and integrated with the concrete by the coalescense of the bitumen particles thereon whereby the adherent layer is intimately interlocked with the concrete to prevent separation therebetween.

2. A product comprising a pavement or like structure comprising a concrete foundation and an adherent bituminous layer consisting essentially of bitumen particles coalesced from a water external phase emulsion and an emulsifying agent, said adherent layer being interlocked and integrated with the concrete by the coalescence of the bituminous particles thereon whereby the layer is intimately bonded with the concrete structure and separation therebetween is prevented.

3. A cured concrete product comprising a concrete structure and an adherent layer of coalesced bituminous particles derived from a water external phase emulsion, said adherent layer being interlocked and integrated with the concrete by a coalescence of the bituminous particles thereof while the concrete is wet whereby the adherent layer is intimately interlocked with the concrete to prevent separation therebetween.

4. A product comprising a concrete structure and an adherent layer consisting essentially of coalesced bitumen particles derived from a water external phase emulsion, said adherent layer being interlocked and integrated with the concrete by the coalescence of the bitumen particles thereon whereby the adherent layer is intimately interlocked with the concrete to prevent separation therebetween, and a wearing surface comprising stone penetrating through the bituminous layer and into the concrete structure.

In testimony whereof I affix my signature.

LESTER KIRSCHBRAUN.